(12) United States Patent
Prior et al.

(10) Patent No.: US 8,567,182 B2
(45) Date of Patent: Oct. 29, 2013

(54) VEHICLE EXHAUST HEAT RECOVERY SYSTEM AND METHOD OF MANAGING EXHAUST HEAT

(75) Inventors: Gregory P. Prior, Birmingham, MI (US); George M. Claypole, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 606 days.

(21) Appl. No.: 12/565,956

(22) Filed: Sep. 24, 2009

(65) Prior Publication Data

US 2011/0067389 A1  Mar. 24, 2011

(51) Int. Cl.
*F01N 3/00* (2006.01)
*F01N 5/02* (2006.01)

(52) U.S. Cl.
USPC .............................. 60/320; 60/298; 60/274

(58) Field of Classification Search
USPC ............... 60/298, 320; 165/96, 164; 475/117; 477/98
See application file for complete search history.

(56) References Cited

U.S. PATENT DOCUMENTS

| | | | | |
|---|---|---|---|---|
| 4,258,676 A * | 3/1981 | Lamm | ..................... | 123/142.5 R |
| 4,289,195 A * | 9/1981 | Bellot et al. | .................. | 165/204 |
| 5,799,632 A * | 9/1998 | Bennett | .................. | 123/142.5 R |
| 7,467,605 B2 * | 12/2008 | Szalony et al. | ............ | 123/41.04 |
| 7,735,461 B2 * | 6/2010 | Vetrovec | .................... | 123/41.14 |
| 2004/0144084 A1 * | 7/2004 | Hara | ................ | 60/288 |
| 2005/0202933 A1 * | 9/2005 | Sorab et al. | .................. | 477/161 |
| 2006/0185626 A1 * | 8/2006 | Allen et al. | ................ | 123/41.12 |
| 2008/0223317 A1 | 9/2008 | Shintani et al. | | |
| 2010/0205946 A1 * | 8/2010 | Fukudome et al. | ............. | 60/298 |

* cited by examiner

*Primary Examiner* — Kenneth Bomberg
*Assistant Examiner* — Jason Sheppard
(74) *Attorney, Agent, or Firm* — Quinn Law Group, PLLC

(57) ABSTRACT

An exhaust heat recovery system (EHRS) for a vehicle is operable to direct exhaust heat to a vehicle transmission under certain operating conditions. In some embodiments, the EHRS may also direct exhaust heat to a heater for vehicle passenger compartment. Preferably, the EHRS is controllable to manage available exhaust heat according to vehicle operating conditions, by prioritizing the heat flow among the engine, the transmission, and the vehicle heater. The EHRS may also operate in a bypass mode during which exhaust heat is not directed to the engine, the transmission or the vehicle heater. A method of managing exhaust heat recovery on a vehicle having an EHRS is also provided.

13 Claims, 3 Drawing Sheets

VEHICLE EXHAUST HEAT RECOVERY SYSTEM AND METHOD OF MANAGING EXHAUST HEAT

TECHNICAL FIELD

The invention relates to an exhaust heat recovery system for a vehicle, and a method of managing exhaust heat.

BACKGROUND OF THE INVENTION

Rapid warm-up of engine fluid, engine oil, and transmission fluid is important to fuel economy during a cold start (i.e., when the vehicle has not been running and the engine and transmission are relatively cold). Engine warm-up is especially challenging for diesel and hybrid applications, as less fuel is burned. Adequate passenger compartment heater performance is also necessary for passenger comfort. Powering the heater using a motor/generator on a hybrid vehicle can negatively impact fuel economy.

SUMMARY OF THE INVENTION

An exhaust heat recovery system (EHRS) for a vehicle is provided that is operable to direct exhaust heat to a vehicle transmission under certain operating conditions. In some embodiments, the EHRS may also direct exhaust heat to a heater for vehicle passenger compartment. Preferably, the EHRS is controllable to manage available exhaust heat according to vehicle operating conditions, by prioritizing the heat flow among the engine, the transmission, and the vehicle heater. The EHRS may also operate in a bypass mode during which exhaust heat is not directed to the engine, the transmission or the vehicle heater.

Specifically, the EHRS includes an exhaust heat recovery device positioned in the vehicle exhaust system. The device includes a heat exchanger, referred to herein as an exhaust heat recovery device heat exchanger. Under certain vehicle operating conditions, the exhaust heat recovery device is operable to direct exhaust gas through the exhaust heat recovery device heat exchanger, such as by signaling an actuator to open a valve. The EHRS is also operable to bypass the exhaust heat recovery device heat exchanger under other vehicle operating conditions, and simply expel the exhaust heat from the vehicle. The EHRS includes a transmission heat exchanger positioned in thermal communication with the transmission. Conduits containing fluid are arranged to operatively connect the exhaust heat recovery device heat exchanger with the transmission heat exchanger to thereby utilize heat from the exhaust gas to heat the transmission via the fluid. Fluid flow to the transmission heat exchanger may be controlled by a valve positioned downstream of the exhaust heat recovery device heat exchanger and upstream of the transmission heat exchanger. Many different types of valves may be used, such as an H-valve, a rotary valve, or a series of valves.

In one embodiment, the valve is a rotary valve and is in a first position under the first set of vehicle operating conditions and is further positionable by the controller in a second position under a second set of vehicle operating conditions. Additional conduits may be provided to operatively connect the engine with the rotary valve to direct fluid from the engine to the rotary valve without passing through the exhaust heat recovery device. The rotary valve then further directs the fluid in the additional conduits to the transmission heat exchanger when in the second position. Thus, the engine cooling system can be used to cool the transmission by cooling fluid in the additional conduits under the second set of operating conditions, such as when transmission temperature is above a predetermined maximum transmission temperature, engine loading is above a predetermined threshold engine load, and/or engine speed is above a predetermined threshold engine speed, and cooling the transmission is therefore a priority.

The conduits may also direct exhaust heat from the exhaust heat recovery device heat exchanger to the vehicle heater. In one embodiment, the conduits operatively connect the exhaust heat recovery device heat exchanger with the heater upstream of the transmission heat exchanger. Another valve may be positioned upstream of the heater to control flow of exhaust heat to the heater according to vehicle operating conditions. A controller is provided to determine the vehicle operating conditions and control the valve or valves accordingly.

A method of managing exhaust heat recovery on a vehicle having an EHRS as described above includes determining vehicle operating conditions, such as conditions indicative of transmission temperature, engine temperature, engine speed and engine load. Sensors may be used to determine the vehicle operating conditions directly (such as temperature sensors), or the operating conditions may be determined based on other operating conditions or measured values, by a predictive model. The valve positioned upstream of the transmission heat exchanger is then controlled to permit fluid flow from an exhaust heat recovery device to the transmission heat exchanger if the transmission temperature is not greater than a predetermined threshold transmission temperature and the engine temperature is not less than a predetermined threshold engine temperature. This enables the engine to be heated with a higher priority than the transmission at lower temperatures, up to the predetermined threshold engine temperature, while the transmission is then heated at least to a predetermined minimum transmission temperature. The predetermined threshold engine temperature may be correlated with a temperature above which friction losses in the transmission are greater than friction losses in the engine, and may be dependent upon engine load and speed.

Optionally, the method may also include opening a different valve to permit fluid flow from the exhaust heat recovery device to a vehicle heater if the ambient temperature is not greater than a predetermined threshold ambient temperature, or if operator input indicates that heating of the passenger compartment is requested.

Still further, the valve controllable to permit exhaust heat flow to the transmission heat exchanger (referred to as the transmission valve) may be positioned to permit fluid communication between the engine and the transmission heat exchanger if the engine load is above a predetermined threshold engine load, engine speed is above a predetermined threshold engine speed, and/or transmission temperature is above a predetermined maximum transmission temperature. The fluid thus communicated does not pass through the exhaust heat recovery device between the engine and the transmission heat exchanger, as it is fluid cooled by the engine cooling system that is then used to cool the transmission. Under these operating conditions, the exhaust heat is not directed from the exhaust heat recovery device to the conduits, although some minimal amount of heat may be transferred from the exhaust system to the conduits simply due to proximity of the components. By cooling the transmission under such engine loading, engine speed, and/or transmission temperatures, transmission durability and fuel economy may be improved.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
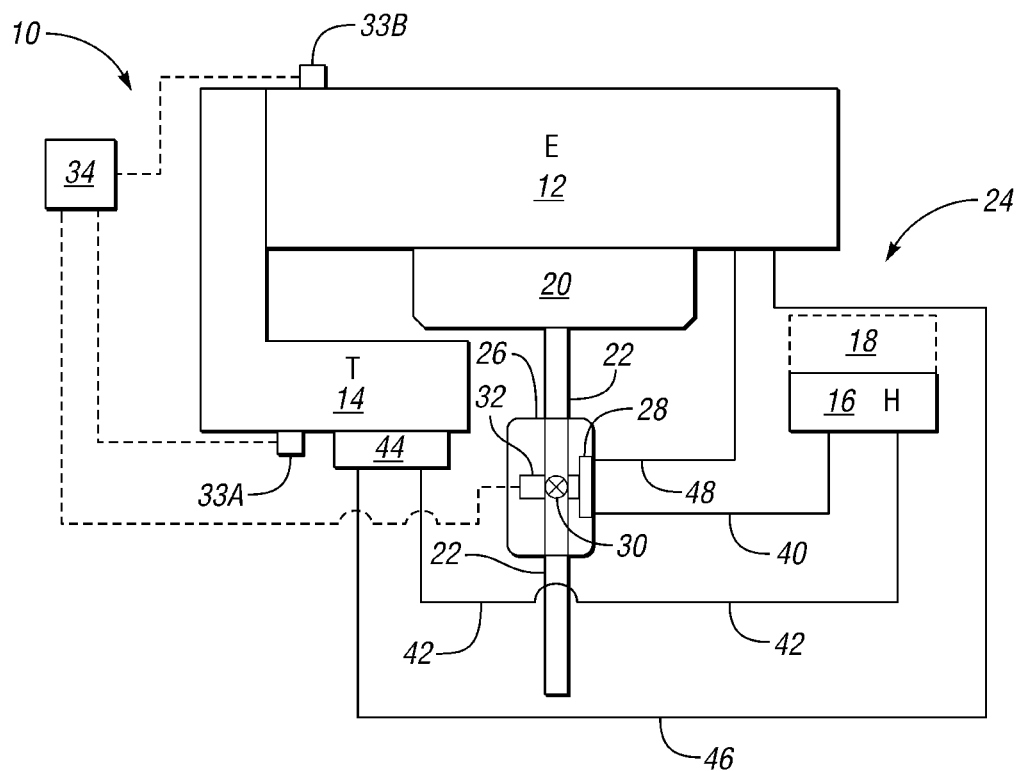
FIG. 1 is a schematic illustration of a first embodiment of a vehicle with a first embodiment of an EHRS that directs exhaust heat to a vehicle heater, then to a transmission heat exchanger, and then to a vehicle engine.

Referring to the drawings, wherein like reference numbers refer to like components throughout the several views, FIG. 1 shows a vehicle 10 that has an engine 12 (labeled E) for propelling the vehicle 10, a transmission 14 (labeled T) operatively connected to the engine 12, and a passenger compartment heater 16 (labeled H) for heating a passenger compartment, indicated in phantom as 18.

The engine 10 is an internal combustion engine of the gasoline or diesel type, and generates exhaust gas in an exhaust system that includes an exhaust manifold 20 and an exhaust pipe 22 extending therefrom. The exhaust gas, which is relatively hot, exits the vehicle via the exhaust pipe 22. An exhaust heat recovery system (EHRS) 24 is provided in order to selectively capture some of the exhaust heat for providing heat to the passenger compartment 16, the transmission 14, and the engine 12. The EHRS 24 includes an exhaust heat recovery device (EHRD) 26 positioned in the exhaust system. Specifically, the EHRD 26 includes an exhaust heat recovery device heat exchanger (EHRDHE) 28, a valve 30, and an exhaust bypass actuator 32 controllable to selectively open the valve 30 to permit some of the exhaust gas in the exhaust pipe to flow through the EHRDHE 28 in a warm-up mode. An electronic controller 34 is operatively connected to the actuator 32, and controls the actuator 32 according to vehicle operating conditions received as input signals from various sensors placed on the vehicle 10 (only an exemplary transmission sensor 33A and engine sensor 33B are shown). The information received by the controller 34 is indicative of such operating conditions as ambient temperature, transmission temperature (e.g., transmission oil temperature), engine temperature (e.g., engine oil temperature or engine coolant temperature), engine speed, and engine loading. The sensors may directly measure the operating conditions, or may provide information used in a predictive model that predicts or estimates these operating conditions.

When operating conditions indicate that a warm-up mode is desirable (ambient temperature, engine temperature, or transmission temperature are below predetermined minimums), the controller 34 controls the actuator 32 to open the valve 30 (if not already opened). If operating conditions indicate no warm-up is required, the controller 34 controls the actuator 32 to close the valve 30 (if not already in a closed position) to establish a bypass mode in which exhaust gas in exhaust pipe 22 is not in thermal communication with the EHRDHE 28. A person of ordinary skill in the art would readily understand the various ways to provide such information indicative of vehicle operating conditions to the controller 34, and would readily understand various algorithms that may be stored on the controller 34 to process the information.

Conduits filled with fluid are arranged to carry heat from the EHRDHE 28 to the engine 12, the transmission 14, and the heater 16. The conduits may be flexible or rigid tubing, or bored, drilled, cast or otherwise formed passages in any vehicle component. Specifically, conduit 40 runs past the EHRDHE 28, in thermal communication therewith, such that fluid in conduit 40 is heated. Conduit 40 carries the heated fluid to the heater 16. After flowing through the heater 16, the fluid flows through conduit 42 to a transmission heat exchanger 44 in thermal communication with the transmission 14 to heat the transmission 14. After flowing through the transmission heat exchanger 44, the fluid flows through conduit 46 to the engine 12 for heating engine oil within the engine 12 according to any known heat transfer mechanisms. Finally, fluid flows from the engine 12 via conduit 48 past the EHRDHE 28 in order to absorb more heat from the exhaust gas before again flowing out through conduit 40. Accordingly, the EHRS 24 prioritizes heat flow to the heater 16, then to the transmission 14, then to the engine 12 when in warm-up mode, and provides substantially no heat flow when in bypass mode. During bypass mode, a minimal amount of heat flow may exist through the EHRDHE 28 to the conduit 40 due to the proximity of the components, even with the valve 30 closed.

Figure 2:
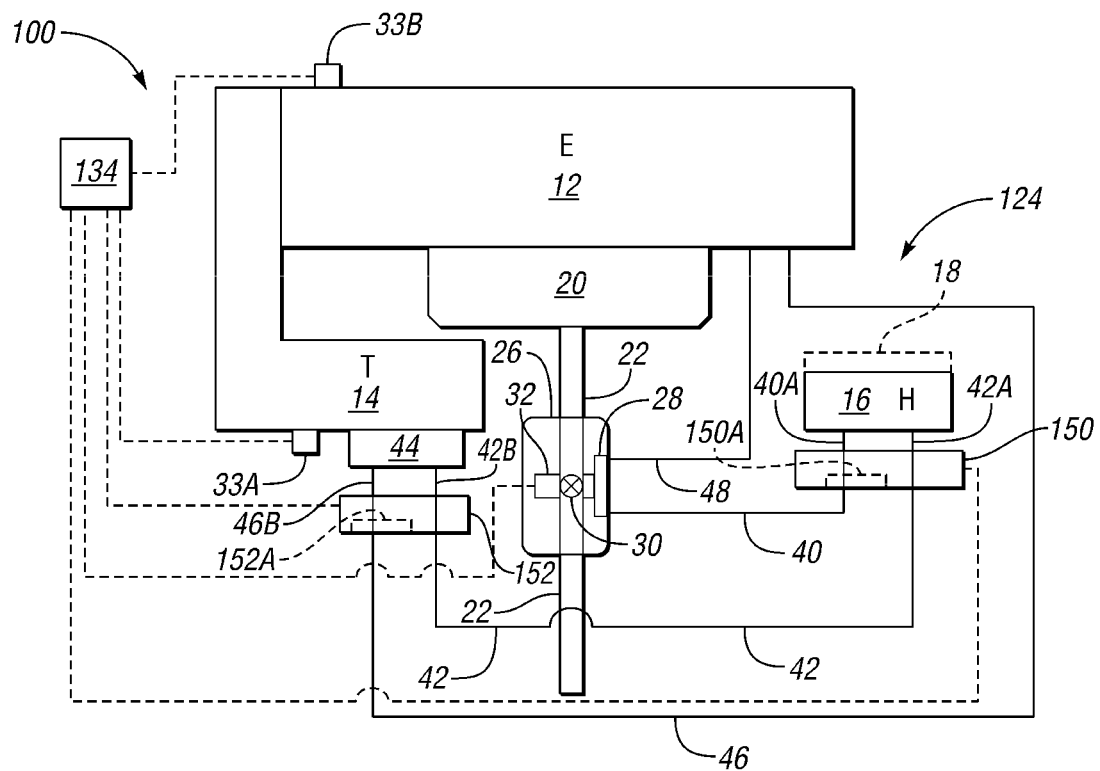
FIG. 2 is a schematic illustration of a second embodiment of a vehicle with a second embodiment of an EHRS that includes valves controllable to direct heat flow to the heater, the transmission, and the engine according to vehicle operating conditions.

Referring to FIG. 2, an alternative embodiment of a vehicle 100 with an alternative embodiment of an EHRS 124 is illustrated. Components of the vehicle 100 and EHRS 124 that are the same as those shown and described with respect to vehicle 10 and EHRS 24 are referred to with the same reference numbers. The EHRS 124 includes a valve 150, also referred to herein as a first valve or a heater valve. Conduits 40 and 42 are in fluid communication with the valve 150, but only selectively in fluid communication with conduits 40A, 42A leading to and from the heater 16 when the valve is in a first state (shown in solid), referred to as open When the valve 150 is controlled to be in a second state (referred to as closed) by a controller 134 in accordance with predetermined vehicle operating conditions, alternate valve channels, represented in phantom as 150A, are positioned in communication with conduits 40, 42 so that fluid flowing in conduit 40 flows directly to conduit 42, bypassing the heater 16. Such a valve is referred to as an "H" valve. However, it should be appreciated that other types of valves may be used.

The EHRS 124 also includes a valve 152, referred to herein as a second valve or a transmission valve, that is similarly controllable by the controller 134 in accordance with predetermined vehicle operating conditions to be in either a first state (shown in solid, referred to as open) or a second state 152A (shown in phantom, referred to as closed). In the first state, shown in solid, conduits 42B and 46B are in communication with conduits 42 and 46, respectively, to permit fluid flow through the transmission heat exchanger 44. When the valve is in the second state, in accordance with predetermined vehicle operating conditions, alternate valve channels, represented in phantom as 152A, are moved from the position shown in FIG. 2 so that they are in communication with conduits 42, 46. Fluid flowing in conduit 42 therefore flows directly to conduit 46, bypassing the transmission heat exchanger 44.

The valves 150, 152 allow an improved heat flow balance during warm-up between the heater 16, the engine 12, and the transmission 16 according to vehicle operating conditions. For example, when ambient temperature is relatively warm (i.e., above a predetermined threshold ambient temperature), and the engine 12 is relatively cold (e.g., has just been started, referred to as a cold start), warming up the engine 12 is a priority. Thus, the controller 134 will open valve 30 and position both valves 150, 152 in the second state 150A, 152A, respectively (i.e., closed), so that fluid flows from conduit 40, to conduit, 42, and then to conduit 46, providing heat to the engine 12, but bypassing the heater 16 and transmission heat exchanger 44. Once the engine 12 is sufficiently warm (i.e., engine temperature is above a predetermined minimum engine temperature), the controller 134 will place valve 152 in a first state (i.e., open) so that fluid heated by the exhaust gas in the EHRD 26 flows from conduit 40, to conduit 42, through the transmission heat exchanger 44 via conduits 42B, 46B, and through conduit 46 to the engine 12, before returning via conduit 48 to the EHRDHE 28.

When operating conditions are such that engine temperature is above the predetermined threshold engine temperature, the transmission temperature is below a predetermined minimum threshold transmission temperature, and ambient temperature is above a predetermined minimum ambient temperature, warming up the transmission 14 is the highest priority to improve overall efficiency. The predetermined threshold engine temperature is correlated with a temperature-dependent friction level of the engine oil for which it is determined that overall operating efficiency is increased by warming the transmission fluid rather than by increasing the engine oil temperature. The predetermined threshold engine temperature may be referred to as a friction cross-over point, and reflects a temperature at which friction reduction (e.g., decreased motoring torque and spin losses) is better achieved by heating the transmission rather than the engine.

Once the engine 12 is warmed to the predetermined threshold engine temperature and the transmission 14 reaches at least the predetermined minimum transmission temperature (e.g., 65 degrees Celsius), then the actuator 32 is controlled so that EHRS 124 operates in bypass mode, with the exhaust gas in the exhaust pipe 22 bypassing the EHRDHE 28, and minimal or no heat added to the conduit 40 by the exhaust gas (any heat added to the conduit 40 by EHRDHE 28 is due to thermal leakage, not to controlled direction of exhaust heat).

When vehicle operating conditions indicate that ambient temperature is below a predetermined threshold ambient temperature, and the engine 12 is below a predetermined threshold engine temperature (i.e., a cold start), then heating both the passenger compartment 18 and the engine 12 are a greater priority than heating the transmission 14. Accordingly, the controller 134 controls the valve 30 to direct exhaust gas to the EHRDHE 28, places the valve 152 in the second state 152A (i.e., closed), and places the valve 150 in the first state (i.e., open). Accordingly, heated fluid flows from the EHRDHE 28 through conduits 40 and 40A to heat the heater 16, then through conduits 42A and 42 directly to conduit 46, bypassing the transmission heat exchanger 44, to heat the engine 12 before returning to the EHRDHE 28 via conduit 48. After the engine 12 is sufficiently warmed-up (i.e., above the predetermined threshold engine temperature, the controller 134 also opens the valve 152 to allow the transmission 14 to be heated as well. When the transmission temperature then reaches the predetermined minimum transmission temperature, both the transmission 14 and the engine 12 are sufficiently warm, and the controller 134 controls actuator 32 so that valve 30 is closed, and the EHRS 124 operates in bypass mode, with the exhaust gas in the exhaust pipe 22 bypassing the EHRDHE 28. Little or no heat is added to the conduit 40 (any heat added to the conduit 40 by EHRDHE 28 is due to thermal leakage, not to controlled direction of exhaust heat). Heat may be provided to the heater 16 during bypass mode via another heat source other than the exhaust gas in exhaust pipe 22 to ensure passenger comfort (e.g., via cooling jacket heat flow).

Figure 3:
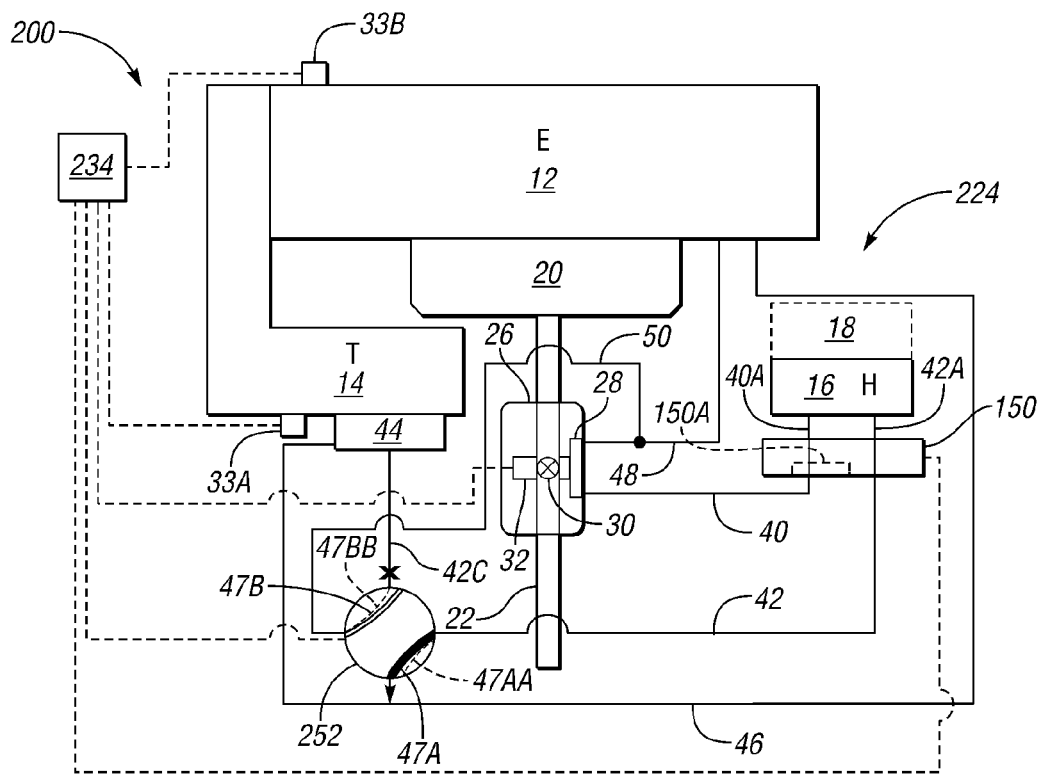
FIG. 3 is a schematic illustration of a third embodiment of a vehicle with a third embodiment of an EHRS that includes valves controllable to direct heat flow to the heater, the transmission, and the engine according to vehicle operating conditions, and to direct cooling fluid from the engine to the transmission under high engine loading.
Figure 4:
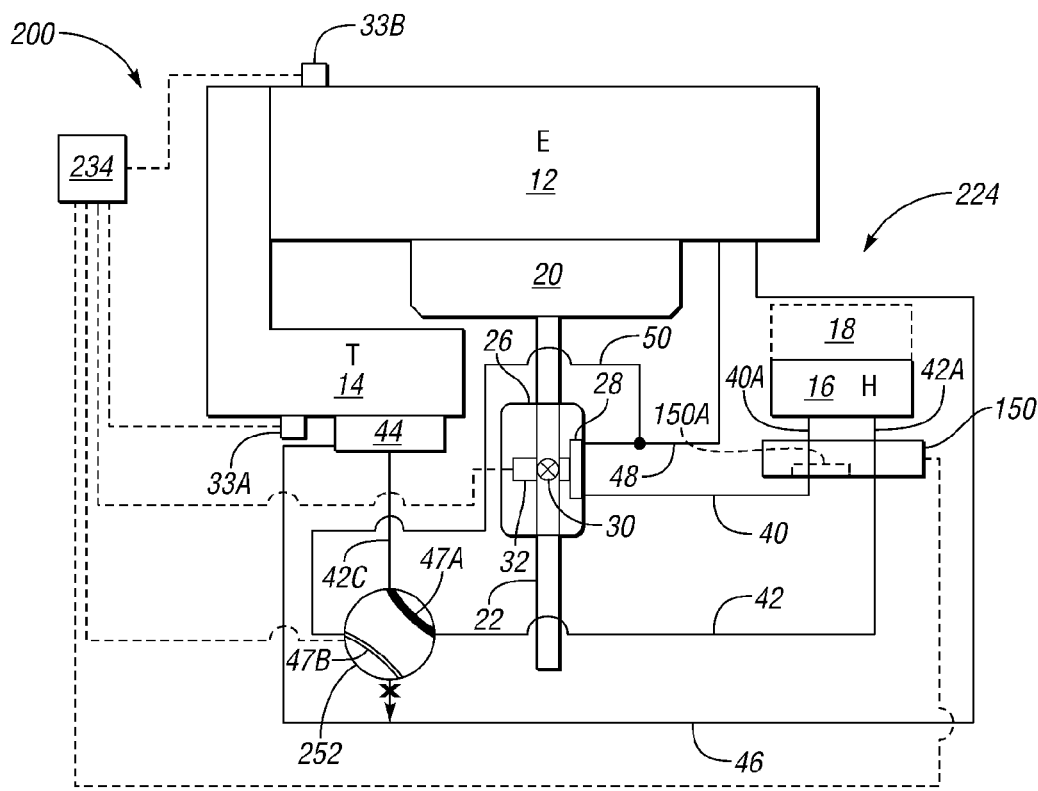
FIG. 4 is a schematic illustration of the EHRS of FIG. 3 with the valves directing cooling fluid from the engine to the transmission under high engine loading, high engine speeds, and/or high transmission temperatures.

Referring to FIGS. 3 and 4, an alternative embodiment of a vehicle 200 with an alternative embodiment of an EHRS 224 is illustrated. Components of the vehicle 200 and EHRS 224 that are the same as those shown and described with respect to vehicles 10 and 100, and EHRS 24 and EHRS 124 are referred to with the same reference numbers. In addition to valves 30 and 150, the EHRS 224 includes a valve 252, referred to herein as a second valve or a transmission valve, that is a rotary valve and is similarly controllable by the controller 234 in accordance with predetermined vehicle operating conditions to be in either a first position, shown in FIG. 4, or another position, shown in FIG. 3, or still another position shown with passages 47A, 47B in phantom in FIG. 3, labeled 47AA and 47BB, referred to as a second position. The valve 252 has two valve channels 47A and 47B that are arranged such that in the state or position of FIG. 3, channel 47A establishes fluid communication between conduit 42 and conduit 46 through valve 252, while channel 47B is out of communication (i.e., not aligned with) with conduit 42C leading to transmission heat exchanger 44, as indicated by the "X" across the conduit 42C. Furthermore, with valve 252 in the state shown in solid in FIG. 3, fluid cannot flow through valve 252 to transmission heat exchanger 44 from an additional conduit 50 leading from conduit 48.

When vehicle operating conditions indicate that ambient temperature is below a predetermined threshold ambient temperature and that engine temperature is below a predetermined threshold engine temperature, warming the heater 16 and the engine 12 are given priority by the controller 134 controlling the valve 30 to direct exhaust heat to the EHRDHE 28, position valve 150 in a first (open) position, and positions valve 252 in the state or position shown in solid in FIG. 3. Accordingly, heated fluid flows from the EHRDHE 28 through conduits 40 and 40A to heater 16, then through conduits 42A and 42, through valve passage 47A to conduit 46 to heat the engine 12 before returning via conduit 48 to the EHRDHE 28.

When vehicle operating conditions indicate that ambient temperature is above a predetermined threshold ambient temperature, and the engine 12 is below a predetermined threshold engine temperature, then heating the engine 12 is a priority. Thus, the controller 134 controls valve 30 to direct exhaust heat to the EHRDHE 28, positions valve 150 in a second (closed) position 150A, and positions valve 252 in the position of FIG. 3. Accordingly, heated fluid flows from the EHRDHE 28 through conduits 40 and 42, bypassing the heater 16, through valve passage 47A to conduit 46 to heat the engine 12 before returning via conduit 48 to the EHRDHE 28.

When the engine 12 is sufficiently warm (i.e., engine temperature is above the predetermined threshold engine temperature), and the ambient temperature is below the predetermined threshold ambient temperature, the friction cross-over point has been reached and vehicle efficiency is maximized by giving priority to heating the transmission 14 (and heater 16 for passenger comfort) rather than the engine 12. Thus, the controller 234 controls valve 30 to direct exhaust heat to the EHRDHE 28, positions valve 150 in a first (open) position, and positions valve 252 in the position of FIG. 4. Accordingly, heated fluid flows from the EHRDHE 28 through conduits 40, 40A, 42A and 42, heating the heater 16, through valve passage 47A to transmission heat exchanger 44. From the transmission heat exchanger 44, the fluid flows to the engine 12 through the conduit 46, with the fluid in conduit 46 now relatively cold, and returning to the EHRDHE via conduit 48.

When the engine 12 is sufficiently warm (i.e., engine temperature is above the predetermined threshold engine temperature), and the ambient temperature is above the predetermined threshold ambient temperature, the friction cross-over point has been reached and vehicle efficiency is maximized by giving priority to heating the transmission 14 rather than the engine 12 and the heater 16. Thus, the controller 134 controls valve 30 to direct exhaust heat to the EHRDHE 28, positions valve 150 in the second (closed) position 150A, and positions valve 252 in the state or position of FIG. 4. Accordingly, heated fluid flows from the EHRDHE 28 through conduits 40, and 42, bypassing the heater 16, through valve passage 47A and conduit 42C to transmission heat exchanger 44, before flowing to the engine 12 through conduit 46, and returning to the EHRDHE via conduit 48.

If vehicle operating conditions indicate that (i) engine load is above a predetermined threshold engine load (e.g., high thermal loading, such as when the vehicle 200 is used for towing); (ii) engine speed is above a predetermined engine speed; and/or (iii) transmission temperature is above a predetermined maximum transmission temperature (e.g., 90 degrees Celsius), cooling of the transmission 14 is a priority to increase overall operating efficiency. Thus, the controller 234 controls valve 30 to operate in a bypass mode, not directing exhaust heat to the EHRDHE 28. Furthermore, the controller 234 positions valve 150 in the second (closed) position 150A, and positions valve 252 in the position 47BB shown in phantom in FIG. 3, referred to as a second position, in which valve passage 47B connects additional conduit 50 to conduit 42C, and valve passage 47A does not connect conduit 42 to conduit 46. Engine coolant cooled by an engine cooling system (not shown) is directed through conduit 48, additional conduit 50, through passage 47B (in position 47BB) of valve 252, through conduit 42C to transmission heat exchanger 44, and through conduit 46 to engine 12.

If engine loading is below the predetermined threshold engine load, engine temperature is above the predetermined threshold engine temperature, and transmission temperature is above the predetermined minimum transmission temperature and below the predetermined maximum transmission temperature (i.e., within an acceptable temperature range in which neither heating or cooling is necessary), then valve 30 is controlled to operate in bypass mode, and valve 252 is positioned in the position of FIG. 3 in which the valve passages 47A, 47B are shown in solid, so that no exhaust heat is used for heating the vehicle 10 and the cooling system of the engine 12 is not used for cooling the transmission 14.

Figure 5:
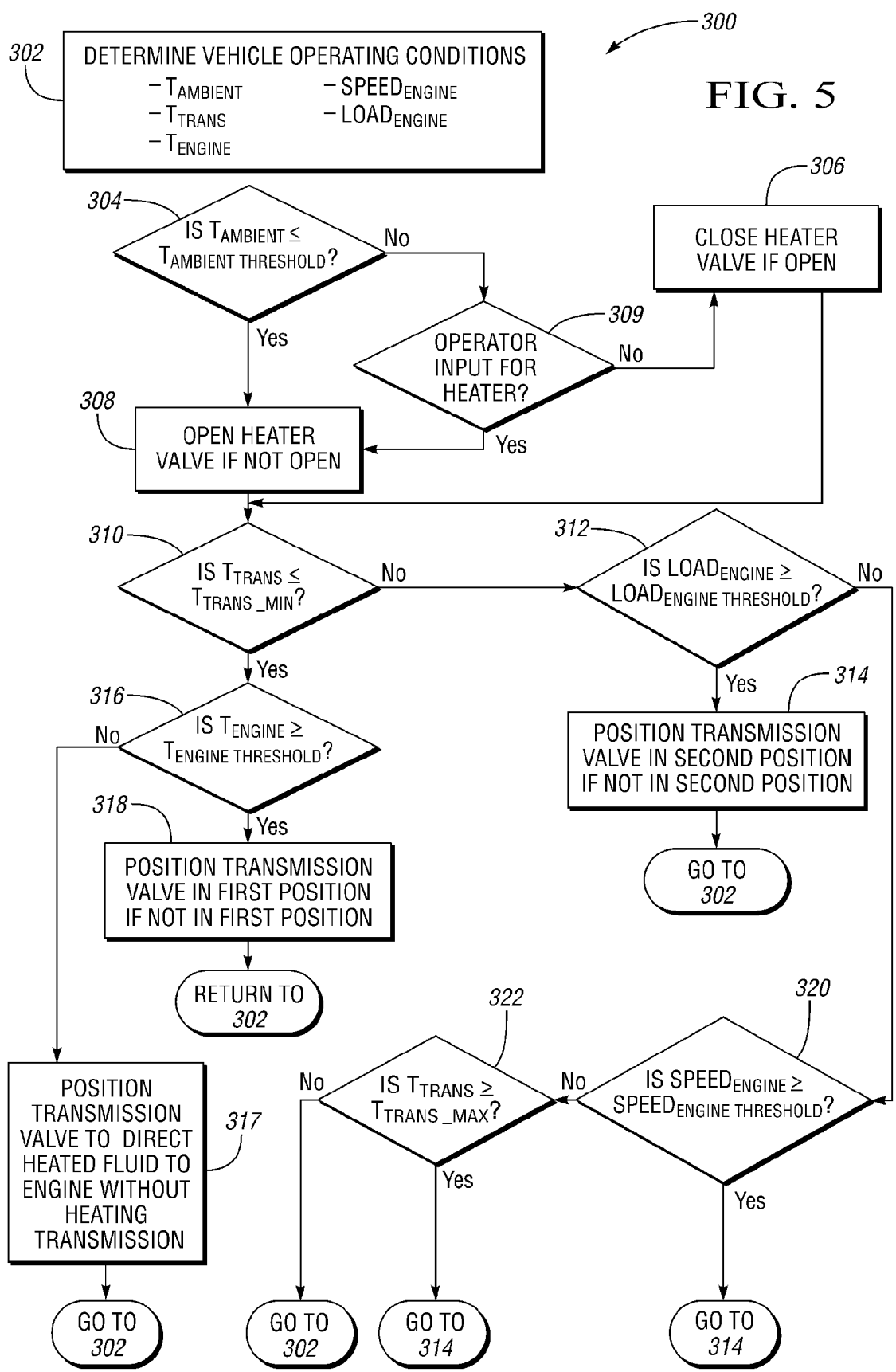
FIG. 5 is a flowchart illustrating a method of managing exhaust heat recovery.

Referring to FIG. 5, a method 300 of managing exhaust heat recovery is illustrated in a flowchart. The method 300 may be performed by the controller 234 of the EHRS 224 of FIGS. 3 and 4, and will be described with respect to EHRS 224, although the method is not limited to use with the structure of the EHRS 224.

The method 300 begins at step 302, in which the controller 234 determines vehicle operating conditions from various vehicle sensors, such as sensors 33A and 33B, either my direct measurement or indirectly, according to a predictive model stored as an algorithm in the controller 234, as described above. The vehicle operating conditions include the ambient temperature, $T_{AMBIENT}$, the transmission temperature, $T_{TRANS}$, such as transmission oil temperature, and the engine temperature, $T_{ENGINE}$. Optionally, the vehicle operating conditions may include engine speed, $SPEED_{ENGINE}$, and engine loading, $LOAD_{ENGINE}$, such as if steps 312 and 314 (described below) are included in the method 300.

In step 304, the controller 234 then determines whether $T_{AMBIENT}$ is less than or equal to a predetermined ambient threshold temperature, $T_{AMBIENT\_THRESHOLD}$. $T_{AMBIENT\_THRESHOLD}$ is a temperature selected based on the requirements of the vehicle heater 16. That is, at or below this temperature, it is determined that the vehicle heater 16 should be supplemented with heating via the exhaust. If $T_{AMBIENT}$ is less than or equal to $T_{AMBIENT\_THRESHOLD}$, then the heater valve 150 is placed in the open position in step 308. If $T_{AMBIENT}$ is not less than or equal to $T_{AMBIENT\_THRESHOLD}$, then, in step 309, a determination is made as to whether there is any operator input requesting heating of the passenger compartment 18. If operator input has been received by the controller 234, then the method moves to step 308. If not, then the method 300 moves to step 306, and the heater valve 150 is closed (i.e., placed in the second state 150A (i.e., closed) if it had previously been in the open position.

After either step 306 or step 308, the method 300 moves to step 310, in which the controller 234 determines whether $T_{TRANS}$ is less than or equal to the predetermined minimum transmission temperature, $T_{TRANS\_MINIMUM}$. It should be noted that step 310 could be carried out prior to steps 304, 306 and 308 if transmission heating is to be given a higher priority than passenger compartment heating. In that case, the method 300 would move from step 302 to step 310, and only after the remaining steps of the flowchart of FIG. 5 are carried out would the method 300 move to step 304.

In step 310, if it is determined that $T_{TRANS}$ is less than or equal to $T_{TRANS\_MINIMUM}$, then heating of the transmission 14 with the EHRS 124 may be in order, but only if the engine temperature is not less than a predetermined engine temperature, $T_{ENGINE\_THRESHOLD}$, below which heating of the engine 12 is given priority over heating of the transmission 14. Accordingly, in step 316, if it is determined that $T_{ENGINE}$ is greater than or equal to $T_{ENGINE\_THRESHOLD}$, then in step 318 the transmission valve 252 will be placed in the first position of FIG. 4 to allow heated fluid to flow to the transmission heat exchanger 44. The method 300 then returns to step 302 to continue monitoring vehicle operating conditions and managing exhaust heat recovery accordingly.

If it is determined that $T_{ENGINE}$ is not greater than or equal to $T_{ENGINE\_THRESHOLD}$ (i.e., is less than $T_{ENGINE\_THRESHOLD}$) in step 316, then the engine 12 is not sufficiently warm to divert any of the exhaust heating to the transmission 14. Accordingly, the method moves to step 317, in which the transmission valve 252 is placed in the position shown in solid in FIG. 3, if not already in that position. That is, the transmission valve 252 is placed in the position to direct heated fluid to the engine 12 without passing through the transmission heat exchanger 44. The method 300 returns to step 302.

If it is determined that $T_{TRANS}$ is not less than or equal to $T_{TRANS\_MINIMUM}$ in step 310, then the transmission 14 is at a temperature that does not require additional heating from the EHRS 224 to improve operating efficiency. Thus, the method 300 then determines whether engine loading, engine speed, or transmission temperature indicates that cooling of the transmission is in order for improved transmission durability or system efficiency. Accordingly, the method 300 moves to step 312 to consider loading of the engine 12. Specifically, the method 300 determines whether the engine load, $LOAD_{ENGINE}$, is greater than or equal to a predetermined engine load, $LOAD_{ENGINE\_THRESHOLD}$. If the $LOAD_{ENGINE}$ is greater than or equal to $LOAD_{ENGINE\_THRESHOLD}$, then efficiency may be improved by using fluid cooled by the engine cooling system to cool the transmission 14. Accordingly, in step 314, the transmission valve 252 is placed in the second position (shown in phantom in FIG. 3) to permit fluid cooled by the engine cooling system to pass through the transmission heat exchanger 44, as described with respect to FIG. 3 above. The method 300 then returns to step 302.

If $LOAD_{ENGINE}$ is not greater than or equal to $LOAD_{ENGINE\_THRESHOLD}$, then the method 300 moves to step 320 to consider whether the speed of the engine 12 is greater than a predetermined engine speed returns, $SPEED_{ENGINE\_THRESHOLD}$. If the speed of the engine 12 is greater than $SPEED_{ENGINE\_THRESHOLD}$, the method 300 moves to step 314, and the transmission valve 252 is placed in the second position (shown in phantom in FIG. 3) to permit fluid cooled by the engine cooling system to pass through the transmission heat exchanger 44, as described with respect to FIG. 3 above. The method 300 then returns to step 302.

If $SPEED_{ENGINE}$ is not greater than or equal to $SPEED_{ENGINE\_THRESHOLD}$, then the method 300 moves to step 322 to consider whether the temperature of the transmission is greater than a predetermined maximum transmission temperature, $T_{TRANS\_MAXIMUM}$. If the temperature of the transmission is greater than a $T_{TRANS\_MAXIMUM}$, the method 300 moves to step 314, and the transmission valve 252 is placed in the second position (shown in phantom in FIG. 3) to permit fluid cooled by the engine cooling system to pass through the transmission heat exchanger 44, as described with respect to FIG. 3 above. The method 300 then returns to step 302.

Accordingly, in the various embodiments described above, exhaust heat that would otherwise be wasted is used for passenger compartment heating, transmission heating or engine heating, and the various conduits and valves provided in the embodiments shown in FIGS. 1-4 allow the exhaust heat to be managed in order to increase vehicle efficiency.

While the best modes for carrying out the invention have been described in detail, those familiar with the art to which this invention relates will recognize various alternative designs and embodiments for practicing the invention within the scope of the appended claims.

The invention claimed is:

1. An exhaust heat recovery system (EHRS) for a vehicle with an engine, a transmission, and an exhaust system through which exhaust gas is discharged from the engine, comprising:
   an exhaust heat recovery device positioned in the exhaust system and that has an exhaust heat recovery device heat exchanger and is operable to direct exhaust gas through the exhaust heat recovery device heat exchanger;
   a transmission heat exchanger positioned in thermal communication with the transmission;
   conduits containing fluid and arranged to operatively connect the exhaust heat recovery device heat exchanger with the transmission heat exchanger to thereby utilize heat from the exhaust gas to heat the transmission via the fluid;
   wherein the vehicle has a passenger compartment and a heater in thermal communication with the passenger compartment; wherein the conduits are further arranged to operatively connect the exhaust heat recovery device heat exchanger and the heater to thereby utilize the heat from the exhaust gas to heat the passenger compartment via the fluid; and
   a valve positioned in the conduits downstream of the exhaust heat recovery device and upstream of the heater; and wherein the valve is selectively openable to permit fluid flow first from the exhaust heat recovery device to the valve and then from the valve to the heater.

2. The EHRS of claim 1, further comprising an additional valve positioned in the conduits downstream of the exhaust heat recovery device and upstream of the transmission heat exchanger; and wherein the additional valve is selectively positionable to permit fluid flow to the transmission heat exchanger.

3. The EHRS of claim 2, further comprising:
   a controller configured to receive information indicative of vehicle operating conditions and to position the valve to permit fluid flow to the transmission heat exchanger from the exhaust heat recovery device under a first set of vehicle operating conditions.

4. The EHRS valve of claim 3, wherein the additional valve is a rotary valve and is in a first position under the first set of vehicle operating conditions and is further positionable by the controller in a second position under a second set of vehicle operating conditions; and further comprising:
   additional conduits operatively connecting the engine with the rotary valve to direct fluid from the engine to the rotary valve without passing through the exhaust heat recovery device; and wherein the rotary valve further directs the fluid to the transmission heat exchanger when in the second position.

5. The EHRS of claim 1, wherein the conduits operatively connect the exhaust heat recovery device heat exchanger with the heater upstream of the transmission heat exchanger.

6. The EHRS of claim 1, wherein the conduits further operatively connect with the engine downstream of the transmission heat exchanger.

7. An exhaust heat recovery system (EHRS) for a vehicle with an engine, a transmission, a passenger compartment with a heater, and an exhaust system through which exhaust gas is discharged from the engine, comprising:
   an exhaust heat recovery device positioned in the exhaust system and having an exhaust heat recovery device heat exchanger and an actuator selectively operable to direct exhaust gas through the exhaust heat recovery device heat exchanger;
   a transmission heat exchanger positioned in thermal communication with the transmission;
   conduits containing fluid and operatively connected with the exhaust heat recovery device heat exchanger;
   a first valve selectively positionable in an open state to operatively connect the exhaust heat recovery device heat exchanger and the heater via the conduits so that fluid flows from the exhaust heat recovery device to the first valve and then to the heater to thereby utilize heat from the exhaust gas to heat the passenger compartment, and is selectively positionable in a closed state so that fluid directed from the exhaust heat recovery device bypasses the heater;
   a second valve selectively positionable to operatively connect the exhaust heat recovery device heat exchanger and the transmission heat exchanger via the conduits downstream of the first valve to thereby utilize heat from the exhaust gas to heat the transmission; and
   a controller configured to position the first and second valves in response to vehicle operating conditions.

8. The EHRS of claim 7, wherein the second valve is a rotary valve and is positionable by the controller in a first position under a first set of vehicle operating conditions to operatively connect the exhaust heat recovery device heat exchanger and the transmission heat exchanger and is further positionable by the controller in a second position under a second set of vehicle operating conditions; and further comprising:

at least one additional conduit operatively connecting the engine with the second valve to direct fluid from the engine to the second valve without passing through the exhaust heat recovery device between the engine and the second valve; and wherein the second valve further directs fluid to the transmission heat exchanger via the at least one additional conduit when in the second position.

9. A method of managing exhaust heat recovery on a vehicle comprising:

determining vehicle operating conditions including conditions indicative of transmission temperature, engine temperature, and ambient temperature;

positioning a valve to permit fluid flow from an exhaust heat recovery device to a transmission heat exchanger if the transmission temperature is not greater than a predetermined threshold transmission temperature and the engine temperature is not less than a predetermined threshold engine temperature;

opening a different valve to permit fluid flow from the exhaust heat recovery device first to the different valve and then through the different valve directly to a vehicle heater if either the ambient temperature is less than a predetermined threshold ambient temperature or in response to operator input; and wherein the different valve is upstream of the valve in fluid flow from the exhaust heat recovery device.

10. The method of claim 9, wherein the vehicle operating conditions further include engine load, and further comprising:

positioning the valve to permit fluid communication between the engine and the transmission heat exchanger if the engine load is above a predetermined engine load; wherein the fluid communicated from the engine to the transmission heat exchanger does not pass through the exhaust heat recovery device between the engine and the transmission heat exchanger.

11. The method of claim 9, wherein the vehicle operating conditions further include engine speed, and further comprising:

positioning the valve to permit fluid communication between the engine and the transmission heat exchanger if the engine speed is above a predetermined engine speed; wherein the fluid communicated from the engine to the transmission heat exchanger does not pass through the exhaust heat recovery device between the engine and the transmission heat exchanger.

12. The method of claim 9, further comprising:

positioning the valve to permit fluid communication between the engine and the transmission heat exchanger if the transmission temperature is above a predetermined maximum transmission temperature; wherein the fluid communicated from the engine to the transmission heat exchanger does not pass through the exhaust heat recovery device between the engine and the transmission heat exchanger.

13. The method of claim 9, wherein the vehicle operating conditions further include engine load and engine speed, and further comprising:

positioning the valve to permit fluid communication between the engine and the transmission heat exchanger if the engine load is above a predetermined engine load, the engine speed is above a predetermined engine speed, or the transmission temperature is above a predetermined maximum transmission temperature; wherein the fluid communicated from the engine to the transmission heat exchanger does not pass through the exhaust heat recovery device between the engine and the transmission heat exchanger.

\* \* \* \* \*